United States Patent
Zou et al.

(10) Patent No.: US 10,916,994 B2
(45) Date of Patent: Feb. 9, 2021

(54) MOTOR STRUCTURE

(71) Applicant: DELTA ELECTRONICS, INC., Taoyuan (TW)

(72) Inventors: Ching-Cheng Zou, Taoyuan (TW); Han-En Chien, Taoyuan (TW); Hung-Chi Chen, Taoyuan (TW); Meng-Yu Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 45 days.

(21) Appl. No.: 16/368,636

(22) Filed: Mar. 28, 2019

(65) Prior Publication Data
US 2020/0227980 A1   Jul. 16, 2020

(30) Foreign Application Priority Data
Jan. 11, 2019   (CN) .......................... 2019 1 0026566

(51) Int. Cl.
*H02K 9/22*   (2006.01)
*H02K 5/10*   (2006.01)
(Continued)

(52) U.S. Cl.
CPC .................. *H02K 9/22* (2013.01); *H02K 5/10* (2013.01); *H02K 5/20* (2013.01); *H02K 5/24* (2013.01);
(Continued)

(58) Field of Classification Search
CPC ........... H02K 9/22; H02K 5/10; H02K 11/33; H02K 5/20; H02K 5/24; H02K 9/06; H02K 2211/03
(Continued)

(56) References Cited

U.S. PATENT DOCUMENTS

| | | | | |
|---|---|---|---|---|
| 5,939,807 A | * | 8/1999 | Patyk ..................... | H02K 5/161 310/64 |
| 6,577,030 B2 | * | 6/2003 | Tominaga ............ | B62D 5/0406 310/64 |

(Continued)

FOREIGN PATENT DOCUMENTS

| CN | 102324799 A | 1/2012 |
|---|---|---|
| CN | 103527525 A | 1/2014 |

(Continued)

*Primary Examiner* — John K Kim
(74) *Attorney, Agent, or Firm* — Kirton McConkie; Evan R. Witt

(57) ABSTRACT

The present invention provides a motor structure including a heat dissipation module, a motor base, a circuit board, a rotor and a winding set. The heat dissipation module has a first side and a second side opposite to each other. The motor base is connected to the heat dissipation module. The first side and the second side are uncovered. The thermal conductivity of the heat dissipation module is greater than that of the motor base. The circuit board is disposed on the first side. The rotor is disposed on the second side. The winding set is disposed on the second side and electrically connected to the circuit board to drive the rotor to rotate. By integrating the motor base and the heat dissipation module into one piece, the assembly process is simplified, and the use of components is eliminated. It benefits to achieve the effects of waterproofing, dustproof and protection.

17 Claims, 6 Drawing Sheets

(51) Int. Cl.
    *H02K 11/33*     (2016.01)
    *H02K 5/20*     (2006.01)
    *H02K 5/24*     (2006.01)
    *H02K 9/06*     (2006.01)

(52) U.S. Cl.
    CPC ............... *H02K 9/06* (2013.01); *H02K 11/33* (2016.01); *H02K 2211/03* (2013.01)

(58) Field of Classification Search
    USPC ........................... 310/51, 52, 53, 58, 59, 64
    See application file for complete search history.

(56) References Cited

U.S. PATENT DOCUMENTS

| | | | | |
|---|---|---|---|---|
| 7,361,844 | B2* | 4/2008 | Vinciarelli | H05K 1/141 |
| | | | | 174/260 |
| 7,762,700 | B2* | 7/2010 | Luo | F21V 29/81 |
| | | | | 362/545 |
| 7,799,615 | B2* | 9/2010 | Vinciarelli | H05K 1/141 |
| | | | | 438/127 |
| 7,845,824 | B2* | 12/2010 | Robotham | F21S 10/02 |
| | | | | 362/231 |
| 9,013,074 | B2* | 4/2015 | Figgins | H02K 1/30 |
| | | | | 310/51 |
| 9,948,154 | B2* | 4/2018 | Bohm | H02K 11/33 |
| 2003/0098660 | A1* | 5/2003 | Erdman | F25D 29/00 |
| | | | | 318/400.22 |
| 2006/0250039 | A1* | 11/2006 | Yamamoto | F04D 25/082 |
| | | | | 310/90 |
| 2007/0176502 | A1* | 8/2007 | Kasai | F04D 25/0693 |
| | | | | 310/71 |
| 2014/0021810 | A1* | 1/2014 | Figgins | H02K 5/24 |
| | | | | 310/51 |
| 2016/0099623 | A1* | 4/2016 | Bohm | H02K 15/14 |
| | | | | 310/43 |
| 2016/0316570 | A1* | 10/2016 | De Vaan | H05K 3/0061 |
| 2020/0227980 | A1* | 7/2020 | Zou | H02K 5/10 |

FOREIGN PATENT DOCUMENTS

| | | |
|---|---|---|
| CN | 105490494 A | 4/2016 |
| CN | 108633216 A | 10/2018 |
| JP | 2012100516 A | 5/2012 |
| TW | 483658 U | 4/2002 |

* cited by examiner

MOTOR STRUCTURE

FIELD OF THE INVENTION

The present disclosure relates to a motor structure, and more particularly to a motor structure having an integrally formed motor base.

BACKGROUND OF THE INVENTION

When the motor is operated for a long time, a large amount of heat is generated. Therefore, some components such as heat sinks must be added to the main body of the motor to dissipate the heat. Conventionally, the heat sink can be fixed on the main body of the motor through a fastening element for example, a screw. However, the assembly process is time-consuming. Moreover, the structure of the fastening element is not easy to match with the size of the motor circuit board and it needs to design an avoidance space.

On the other hand, when the terminals on the circuit board of the conventional motor is electrically conducted to pass through the main body of the motor, some waterproof and insulating accessories have to be additionally designed with the matching hole disposed on the main body of the motor and spatiality corresponding to the terminals on the circuit board, so that the motor can further achieve waterproof effect. In addition to increasing the cost of components, the assembly process is more labor intensive. Furthermore, if it is desired to add heat sinks to the main body of the motor at the same time, it is more difficult to miniaturize the size of the entire structure.

Therefore, there is a need of providing a motor structure having an integrally formed motor base to obviate the drawbacks encountered from the prior arts.

SUMMARY OF THE INVENTION

It is an object of the present disclosure to provide a motor structure having an integrally formed motor base. By utilizing the technique such as over molding or insert molding, the motor base and the heat dissipation module are integrally formed into one piece, so as to simplify the assembly process and eliminate the use of redundant components at the same time. It also benefits to achieve the effects of waterproofing, dustproof and protection.

It is another object of the present disclosure to provide a motor structure having an integrally formed motor base. With the heat dissipation module and the motor base integrally formed into one piece, the strength of the motor base is improved to carry the components such as winding set, and the heat dissipation function is provided by the heat dissipation module, so as to effectively dissipate the heat for example generated from the heat-generating components on the circuit board. The integrally formed structure of the heat dissipation module and the motor base connects the winding set and the circuit board on opposite sides, and provides the functions of structural support and heat dissipation. It benefits the motor structure to achieve the purposes of the effective heat dissipation and the high-density construction.

It is further an object of the present disclosure to provide a motor structure having an integrally formed motor base. The heat dissipation module is integrated with the central portion of the motor base to form one piece and the surrounding portion of the motor base surrounds the central portion of motor base through a deformable connecting element. Since the main components generating the heat and the vibration in the motor structure are disposed on the central portion, the deformable connecting element disposed between the central portion and the surrounding portion can provide a buffer function to improve the supporting strength of the motor base and eliminate the vibration and the noise.

In accordance with an aspect of the present disclosure, there is provided a motor structure. The motor structure includes a heat dissipation module, a motor base, a circuit board, a rotor and a winding set. The heat dissipation module includes a first side and a second side. The first side and the second side are opposite to each other. The motor base is connected to the heat dissipation module and uncovers the first side and the second side of the heat dissipation module. The thermal conductivity of the heat dissipation module is greater than the thermal conductivity of the motor base. The circuit board is disposed on the first side of the heat dissipation module. The rotor is disposed on the second side of the heat dissipation module. The winding set is disposed on the second side of the heat dissipation module. The winding set is electrically connected to the circuit board to drive the rotor to rotate.

In an embodiment, the heat dissipation module and the motor base are combined with each other by over molding or insert molding.

In an embodiment, the motor structure further includes at least one conductive element running through the heat dissipation module, wherein the conductive element includes a first end portion and a second end portion, the first end portion is electrically connected to the circuit board, and the second end portion is electrically connected to the winding set.

In an embodiment, the second end portion includes a fastening element having two arms opposite to each other, wherein the winding set includes at least one conductive terminal clamped between the two arms of the fastening element to be electrically connected with the at least one conductive element.

In an embodiment, the motor structure further includes at least one gasket element disposed between the heat dissipation module and the at least one conductive element to fix the at least one conductive element on the heat dissipation module.

In an embodiment, the heat dissipation module, the motor base, the at least one conductive element and the at least one gasket element are integrally formed into one piece by over molding or insert molding.

In an embodiment, the winding set includes an engagement component engaged with the at least one conductive element.

In an embodiment, the heat dissipation module includes at least one heat dissipation element convexly disposed on the second side.

In an embodiment, the motor structure further includes a first cover disposed on the first side of the heat dissipation module, connected to the motor base and covering the circuit board.

In an embodiment, the motor structure further includes a second cover disposed on the second side of the heat dissipation module and connected to the motor base, wherein an accommodation space is defined by the second cover, the motor base and the heat dissipation module, and the winding set is at least partially received within the accommodation space.

In an embodiment, the motor base includes an airflow channel in fluid communication with the accommodation space.

In an embodiment, the motor structure further includes a thermal conductive element disposed between the first side of the heat dissipation module and the circuit board, wherein the thermal conductive element is at least one selected from the group consisting of a thermal adhesive, a thermal pad and a thermal paste.

In an embodiment, the motor structure further includes a fan blade assembly, wherein the fan blade assembly is connected to the rotor.

In an embodiment, the motor base includes a central portion, a surrounding portion and at least one connecting element. The central portion is connected to the heat dissipation module. The surrounding portion is disposed around the central portion. The at least one connecting element is deformable and connected between the central portion and the surrounding portion. The connecting element includes a first supporting part, a second supporting part and a deformation part. The first supporting part is connected with the central portion, wherein the hardness of the first supporting part is greater than or equal to the hardness of the central portion. The second supporting part is connected with the surrounding portion, wherein the hardness of the second supporting part is greater than or equal to the hardness of the supporting part. The deformation part is connected between the first supporting part and the second supporting part.

In an embodiment, the central portion, the surrounding portion and the at least one connecting element are integrally formed into one piece by over molding or insert molding.

In an embodiment, the winding set is fixed on the central portion.

In an embodiment, the motor base includes a buffer component disposed between the central portion and the surrounding portion.

In an embodiment, the first supporting part, the second supporting part and the deformation part cooperatively form a buffer zone, and the buffer component is filled within the buffer zone.

In an embodiment, the central portion, the surrounding portion, the at least one connecting element and the buffer component are integrally formed into one piece by over molding or insert molding.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
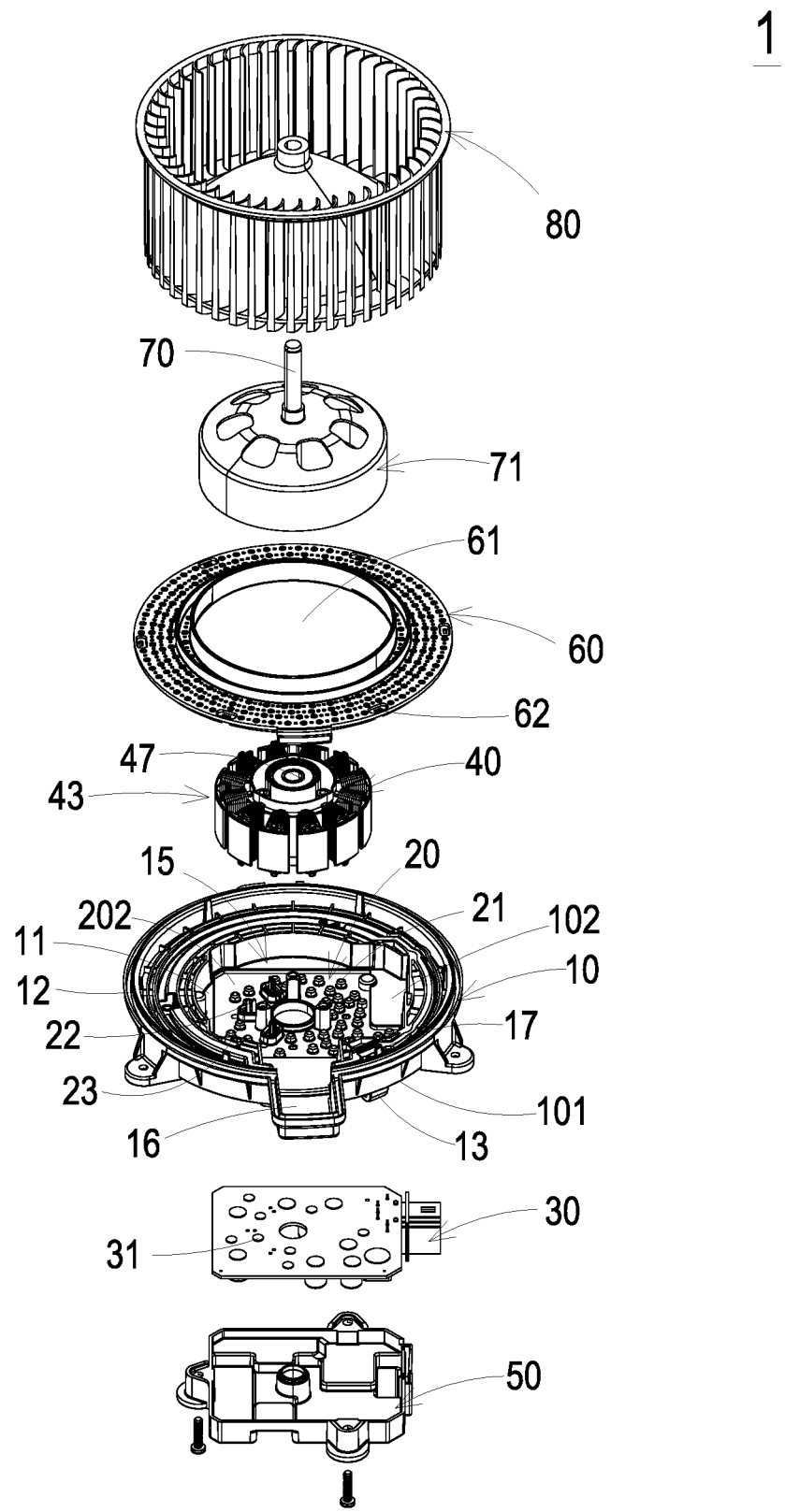
FIG. 1 is an explored view illustrating a motor structure according to an embodiment of the present disclosure.
Figure 2:
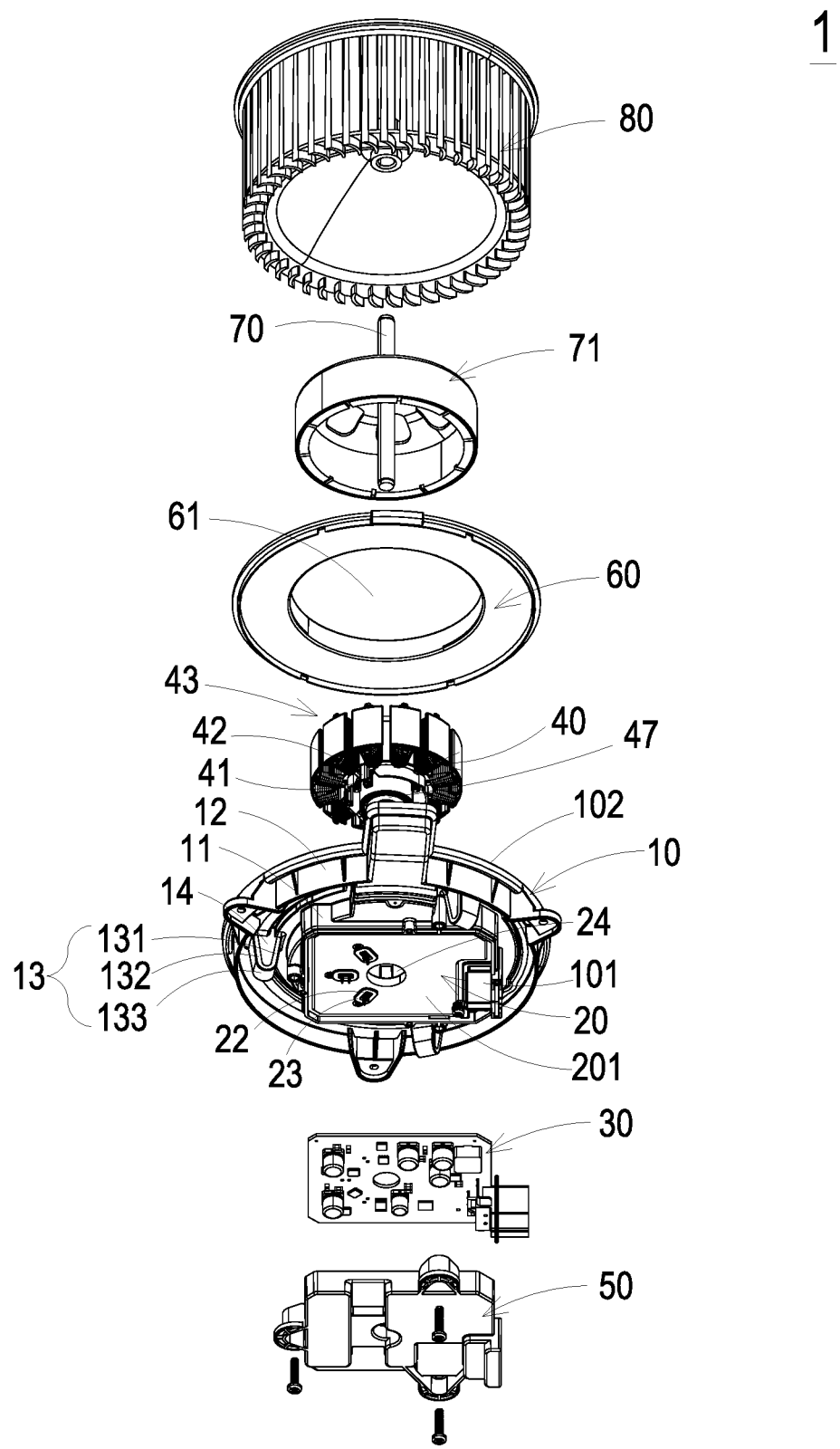
FIG. 2 is another explored view illustrating the motor structure according to the embodiment of the present disclosure and taken at a different observation angle.
Figure 3:
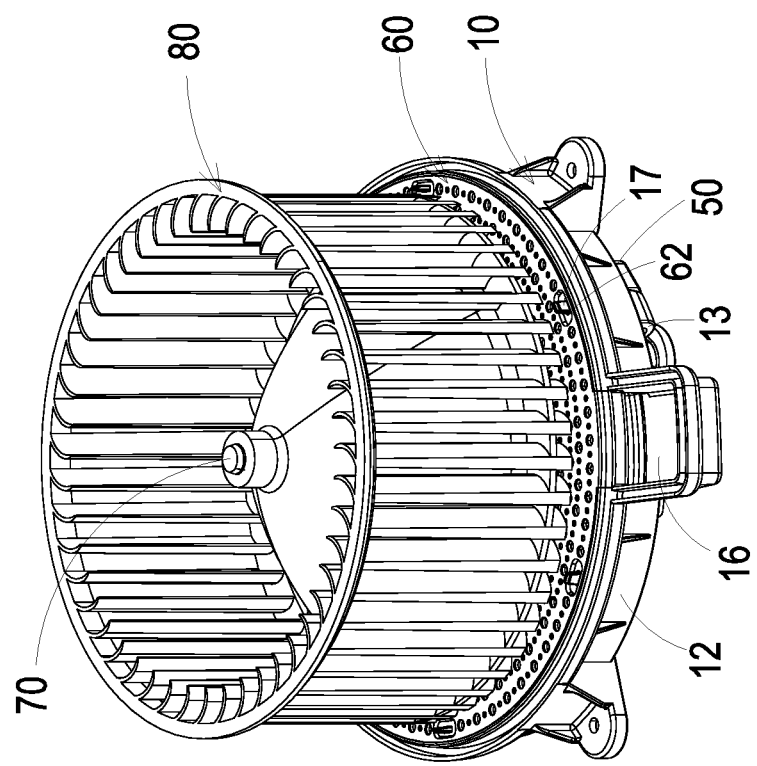
FIG. 3 is a schematic perspective view illustrating the motor structure according to the embodiment of the present disclosure.
Figure 4:
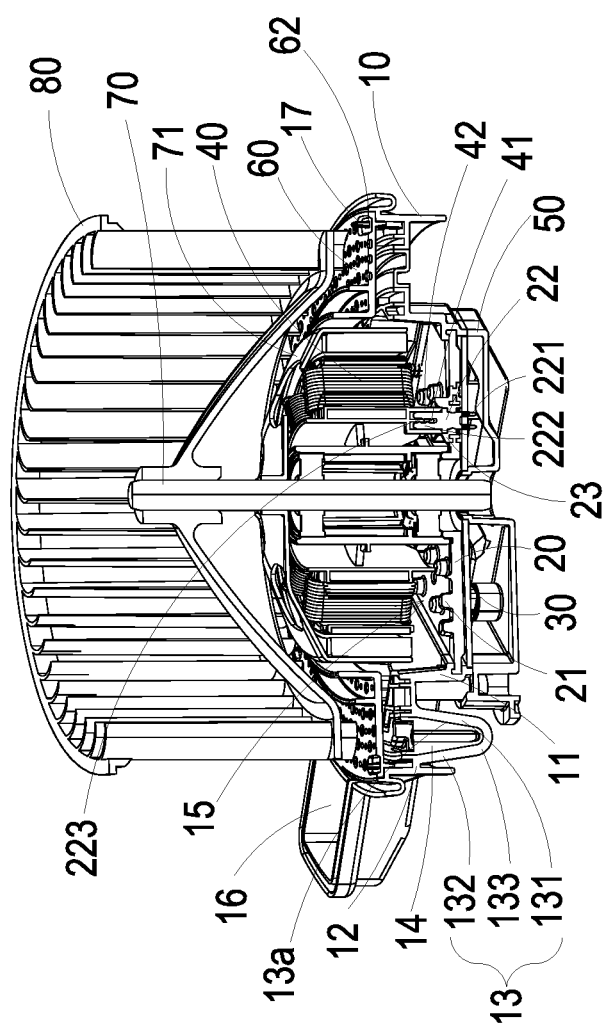
FIG. 4 is a cross sectional view illustrating the motor structure according to the embodiment of the present disclosure.
Figure 5:
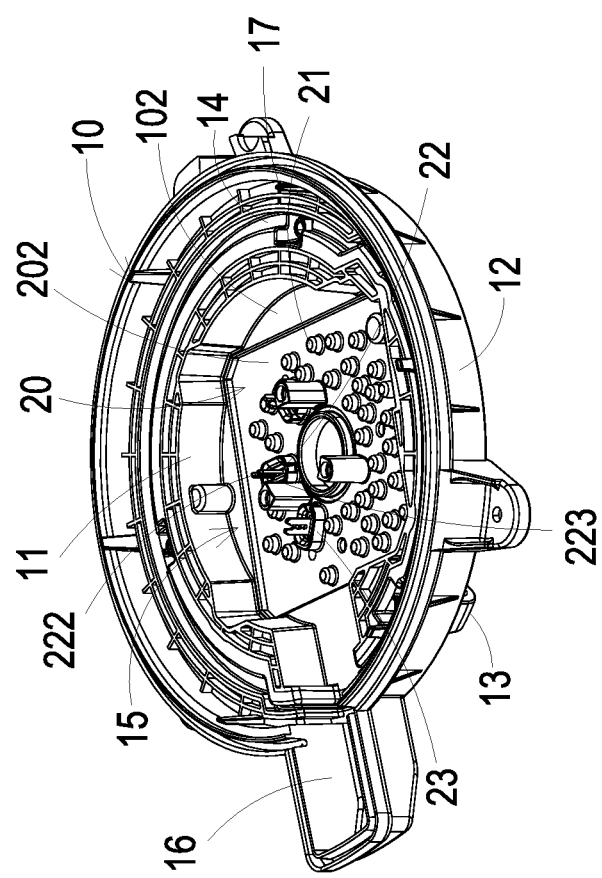
FIG. 5 is a schematic perspective view illustrating the motor base and the heat dissipation module according to the embodiment of the present disclosure.
Figure 6:
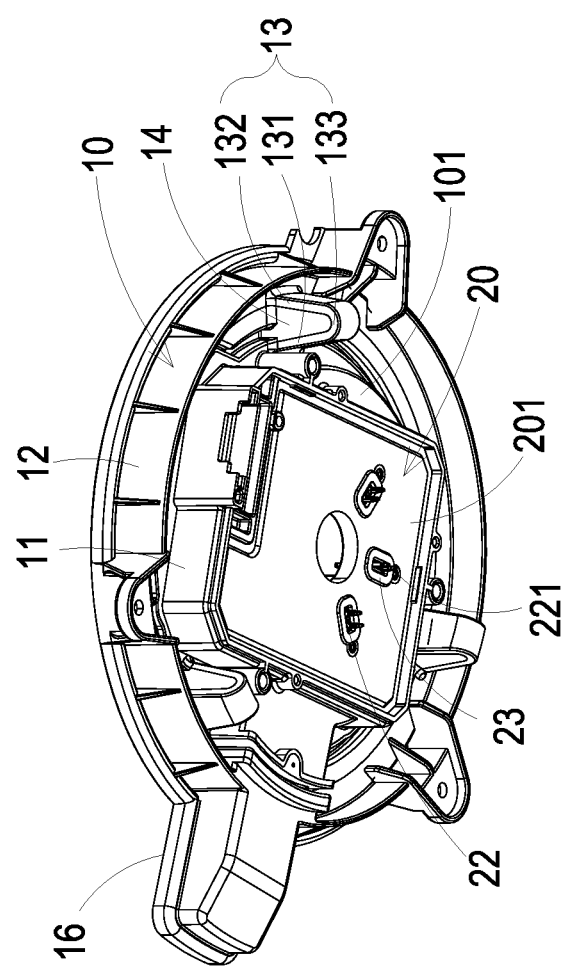
FIG. 6 is another schematic perspective view illustrating the motor base and the heat dissipation module according to the embodiment of the present disclosure and taken at a different observation angle.

FIGS. 1 and 2 are explored views illustrating a motor structure according to an embodiment of the present disclosure. FIG. 3 is a schematic perspective view illustrating the motor structure according to the embodiment of the present disclosure. FIG. 4 is a cross sectional view illustrating the motor structure according to the embodiment of the present disclosure. FIGS. 5 and 6 are schematic perspective views illustrating the motor base and the heat dissipation module according to the embodiment of the present disclosure. In the embodiment, the motor structure 1 includes a motor base 10, a heat dissipation module 20, a circuit board 30, a winding set 40, a first cover 50, a second cover 60, a rotor 71 and a fan blade assembly 80. The motor base 10 includes a central portion 11, a surrounding portion 12, at least one connecting element 13 and a buffer component 14. The heat dissipation module 20 includes a first side 201, a second side 202 and at least one heat dissipation element 21. The first side 201 and the second side 202 are opposite to each other. Preferably but not exclusively, the heat dissipation element 21 is a fin or a bump, which is convexly disposed on the second side 202. The motor base 10 is connected to the heat dissipation module 20 for example through the central portion 11, and uncovers the first side 201 and the second side 202 of the heat dissipation module 20. In the embodiment, the thermal conductivity of the heat dissipation module 20 is greater than the thermal conductivity of the motor base 10. Moreover, in the embodiment, the heat dissipation module 20 and the motor base 10 are further combined with each other by over molding or insert molding so as to integrally form a one-piece structure. The circuit board 30 is disposed on the first side 201 of the heat dissipation module 20. The rotor 71 has a rotating shaft 70 and disposed on the second side 202 of the heat dissipation module 20. The winding set 40 is disposed on the second side 202 of the heat dissipation module 20. The winding set 40 is electrically connected to the circuit board 30. The winding set 40 is configured to drive the rotor 71 to rotate. The rotor 71 rotates through the rotating shaft 70 as an axis. Thus, the motor base 10 and the heat dissipation module 20, which are integrally formed into one piece, are attached to the circuit board 30 through the first side 201 of the heat dissipation module 20. Consequently, the heat generated from the heat-generating components (not shown), which are electronic components disposed on the circuit board 30, can be dissipated effectively. In addition, the motor base 10 and the heat dissipation module 20 are integrally formed into one piece to improve the supporting strength through the second side 202 of the heat dissipation module 20, thereby carrying the winding set 40 firmly.

On the other hand, in the embodiment, the surrounding portion 12 of the motor base 10 is disposed around the central portion 11, and the at least one connecting element 13 is deformable and connected between the central portion 11 and the surrounding portion 12. In the embodiment, the surrounding portion 12 is connected to the central portion 11 through three connecting elements 13 equally spaced apart with each other, but the present disclosure is not limited thereto. In the embodiment, the connecting element 13 further includes a first supporting part 131, a second supporting part 132 and a deformation part 133. In the embodiment, the first supporting part 131 is connected with the central portion 11, and the hardness of the first supporting part 131 is great than or equal to the hardness of the central portion 11. The second supporting part 132 is connected with the surrounding portion 12, and the hardness of the second supporting part 132 is greater than or equal to the hardness of the surrounding portion 12. In addition, the deformation part 133 is connected between the first supporting part 131 and the second supporting part 132, so that the connecting element 13 is deformable and connected between the central portion 11 and the surrounding portion 12. In the embodiment, the central portion 11, the surrounding portion 12 and the at least one connecting element 13 of the motor base 10 are integrally formed into one piece for example by over molding or insert molding, but the present disclosure is not limited thereto. It is noted that the circuit board 30 and the winding set 40 of the motor structure 1 are disposed on the first side 201 and the second side 202 of the heat dissipation module 20, respectively, and the heat dissipation module 20 is further connected to the central portion 11 of the motor base 10. Namely, the circuit board 30 having for example the heat generating components (not shown) to generate the heat and the winding set 40 having for example the main components to generate the vibration are all disposed on the central portion 11 of the motor base 10, and the central portion 11 is connected to the surrounding portion 12 through the at least one connecting element 13. By utilizing the connecting element 13 deformable and connected between the central portion 11 and the surrounding portion 12 to provide a buffer function, the supporting strength of the motor base 10 is improved. It further achieves the functions of eliminating the vibration and the noise.

In the embodiment, the motor structure 1 further includes at least one conductive element 22 and at least one gasket element 23. The conductive element 22 runs through the first side 201 and the second side 202 of the heat dissipation module 20, so as to connect to the circuit board 30 disposed on the first side 201 of the heat dissipation module 20 and the winding set 40 disposed on the second side 202 of the heat dissipation module 20. Certainly, the electrical connection between the circuit board 30 and the winding set 40 is not limited thereto. In addition, the gasket element 23 for example runs through the first side 201 and the second side 202 of the heat dissipation module 20, is disposed between the heat dissipation module 20 and the conductive element 22, and passes through the heat dissipation module 20, so that the conductive element 22 is fixed on the heat dissipation module 20 through the gasket element 23. In the embodiment, the motor base 10, the heat dissipation module 20, the conductive element 22 and the gasket element 23 are integrally formed into one piece for example by over molding or insert molding, so as to simplify the assembly process and eliminate the use of redundant components at the same time. It also benefits to achieve the effects of waterproofing, dustproof and protection. In the embodiment, the conductive element 22 includes a first end portion 221 and a second end portion 222. The first end portion 221 is exposed from the first side 201 and electrically connected to the circuit board 30. The second end portion 222 is exposed from the second side 202 and electrically connected to the winding set 40. In the embodiment, the second end portion 222 further includes a fastening element 223, for example having two arms opposite to each other. The two arms are configured to form two jagged blades in staggered arrangement. The winding set 40 includes at least one conductive terminal 41 and an engagement component 42. The engagement component 42 is configured to engage with the at least one conductive element 22. Preferably but not exclusively, the conductive terminal 41 of the winding set 40 is an end of wire clamped between the two arms of the fastening element 223, so that the conductive terminal 41 is electrically connected with the conductive element 22. Preferably but not exclusively, the engagement component 42 is an engagement slot spatiality corresponding to the two arms of the fastening element 223 and configured to engage with the two arms of the fastening element 223, so that the conductive terminal 41 of the winding set 40 is clamped and fixed between the two arms of the fastening element 223. It should be emphasized that since the two arms of the fastening element 223 are configured to form two jagged blades in staggered arrangement, when the winding set 40 is fixed on the second side 202 of the heat dissipation module 20 and the conductive terminal 41 is assembled on the fastening element 223, the conductive terminal 41 is clamped and the outer insulation layer of copper wire coating over the conductive terminal 41 is scratched to remove, thereby simplifying the assembly process into a single step. Namely, the conductive terminal 41 of the winding set 40 can be assembled and electrically connected to the conductive element 22 without the process of soldering or scratching the copper wire to remove the insulation layer in advance. Certainly, the present disclosure is not limited thereto and not redundantly describe herein.

Preferably but not exclusively, in the embodiment, the motor structure 1 includes a first cover 50 and a second cover 60 connected to the motor base 10. The first cover 50 is disposed on the first side 201 of the heat dissipation module 20, connected to the first surface 101 of the motor base 10 and covers the circuit board 30, so as to protect the electronic components disposed on the circuit board 30 and improve the effects of waterproofing and dustproof. Moreover, in order to improve the effect of heat dissipation, the circuit board 30 is attached to the first side 201 of the heat dissipation module 20 through at least one thermal conductive element 31, for example a thermal adhesive, a thermal pad or a thermal paste. The first cover 50 is fixed on the motor base 10 through for example a screw, but the present disclosure is not limited thereto. In addition, the second cover 60 is disposed on the second side 202 of the heat dissipation module 20 and connected to the second surface 102 of the motor base 10. The second cover 60 has an opening 61. In the embodiment, an accommodation space 15 is defined among the second surface 102 of the motor base 10, the second side 202 of the heat dissipation module 20 and the second cover 60, and the winding set 40 is at least partially received within the accommodation space 15 and located through the opening 61. In the embodiment, the winding set 40 is further combined with a bearing 47 to form a stator 43. In the embodiment, the motor structure 1 is exemplified by an outer rotor 71 and an inner stator 43, but the present disclosure is not limited thereto. Preferably but not exclusively, the motor structure 1 includes a fan blade assembly 80. The fan blade assembly 80 is connected to the rotor 71. The rotating shaft 70 of the rotor 71 is connected to the winding set 40 through the bearing 47, so that the winding set 40 can drive the rotor 71 to rotate. Preferably but not exclusively, in the embodiment, the rotating shaft 70 runs through the central opening 24 disposed on the heat dissipation module 20. In addition, the stator 43 formed by the winding set 40 and the bearing 47 is fixed on the central portion 11 of the motor base 10, so that the motor structure 1 is configured to form a fan motor, but the present disclosure is not limited thereto. Moreover, preferably but not exclusively, the surrounding portion 12 of the motor base 10 includes a first fastening element 17 and the second cover 60 includes a second fastening element 62. The first fastening element 17 and the second fastening element 62 are matched and engaged with each other, so as to fix the second cover 60 on the surrounding portion 12 of the motor base 10. It should be noted that the fastening method of the second cover 60 and the surrounding portion 12 of the motor base 10 is not an essential feature and the present disclosure is not limited thereto. Since the second cover 60 is fixed on the surrounding portion 12 of the motor base 10 and the winding set 40 at least partially received within the accommodation space 15 is fixed on the central portion 11 of the motor base 10, the winding set 40 runs through the opening 61 instead of contacting with the second cover 60. The vibration generated for example by the rotation of the fan blade assembly 80, the rotor 71 and the rotating shaft 70 passing through the bearing 47 relative to the winding set 40 of the stator 43 can be eliminated due to the deformation of the at least one connecting element 13, so that the surrounding portion 12 of the motor base 10 and the second cover 60 are not influenced thereby. On the other hand, the heat dissipation element 21 of the heat dissipation module 20 is convexly disposed on the second side 202. After the second cover 60 is assembled with the surrounding portion 12 of the motor base 10, the heat dissipation element 21 of the heat dissipation module 20 is located within the accommodation space 15. In the embodiment, the motor base 10 further includes an airflow channel 16 disposed on the surrounding portion 12 and in fluid communication between the exterior of the motor base 10 and the accommodation space 15. Thus, the convection of air flowing between the exterior of the motor base 10 and the accommodation space 15 is enhanced, and the heat dissipation effect of the heat dissipation module 20 is enhanced. Certainly, the present disclosure is not limited thereto.

Moreover, in the embodiment, the motor base 10 includes for example but not limited to three connecting elements 13, which are annularly distributed and corresponding to each other or equally spaced apart with each other. The first supporting part 131, the second supporting part 132 and the deformation part 133 of the connecting element 13 are configured to form a U-shaped, W-shaped or V shaped structure having at least one bending bridge disposed between the central portion 11 and the surrounding portion 12, so as to cooperatively form a deformable buffer zone 13*a* (see FIG. 4). Certainly, the size, the shape and the number of the connecting elements 13 formed by the first supporting part 131, the second supporting part 132 and the deformation part 133 are adjustable according to the practical requirements, and the present disclosure is not limited thereto. It should be emphasized that the main components of the motor structure 1 are disposed on the central portion 11 of the motor base 10 and the central portion 11 is connected to the surrounding portion 12 through the connecting elements 13. With the deformation of the connecting elements 13 disposed between the central portion 11 and the surrounding portion 12, a buffer function is provided to improve the supporting strength of the motor base 10 and the effects of eliminating the vibration and the noise. Moreover, in the embodiment, the motor base 10 further includes a buffer component 14. The buffer component 14 is disposed between the central portion 11 and the surrounding portion 12 and filled within the buffer zone 13*a* cooperatively formed by the first supporting part 131, the second supporting part 132 and the deformation part 133. Preferably but not exclusively, the buffer component 14 is made by an elastic material, but the present disclosure is not limited thereto. In the embodiment, the central portion 11, the surrounding portion 12 and the at least one connecting element 13 of the motor base 10 and the buffer component 14 are integrally formed into one piece by over molding or insert molding. Furthermore, the motor structure 1 of the present disclosure combines the motor base 10 with the heat dissipation module 20, so that it facilitates the integrally formed motor structure 1 to integrate the foregoing functions effectively, and achieve the functions of simplifying the assembly process, increasing the density of the structure and improving the shock resistance at the same time. It is not redundantly described herein.

From the above descriptions, the present disclosure provides a motor structure having an integrally formed motor base. By utilizing the technique such as over molding or insert molding, the motor base and the heat dissipation module are integrally formed into one piece, so as to simplify the assembly process and eliminate the use of redundant components at the same time. It also benefits to achieve the effects of waterproofing, dustproof and protection. Moreover, with the heat dissipation module and the motor base integrally formed into one piece, the strength of the motor base is improved to carry the components such as winding set, and the heat dissipation function is provided by the heat dissipation module, so as to effectively dissipate the heat for example generated from the heat-generating components on the circuit board. The integrally formed structure of the heat dissipation module and the motor base connects the winding set and the circuit board on opposite sides, and provides the functions of structural support and heat dissipation. It benefits the motor structure to achieve the purposes of the effective heat dissipation and the high-density construction. In addition, the heat dissipation module is integrated with the central portion of the motor base to form one piece and the surrounding portion of the motor base surrounds the central portion of motor base through at least one deformable connecting element. Since the main components generating the heat and the vibration in the motor structure are disposed on the central portion, the deformable connecting element disposed between the central portion and the surrounding portion can provide a buffer function to improve the supporting strength of the motor base and eliminate the vibration and the noise.

While the disclosure has been described in terms of what is presently considered to be the most practical and preferred embodiments, it is to be understood that the disclosure needs not be limited to the disclosed embodiment.

What is claimed is:

1. A motor structure, comprising:
 a heat dissipation module comprising a first side and a second side, wherein the first side and the second side are opposite to each other;
 a motor base connected to the heat dissipation module and uncovering the first side and the second side of the heat dissipation module, wherein the thermal conductivity of the heat dissipation module is greater than the thermal conductivity of the motor base;
 a circuit board disposed on the first side of the heat dissipation module;
 a rotor disposed on the second side of the heat dissipation module;
 a winding set disposed on the second side of the heat dissipation module, wherein the winding set is electrically connected to the circuit board to drive the rotor to rotate;

at least one conductive element running through the heat dissipation module, wherein the conductive element comprises a first end portion and a second end portion, the first end portion is electrically connected to the circuit board, and the second end portion is electrically connected to the winding set; and at least one gasket element disposed between the heat dissipation module and the at least one conductive element to fix the at least one conductive element on the heat dissipation module.

2. The motor structure according to claim 1, wherein the heat dissipation module and the motor base are combined with each other by over molding or insert molding.

3. The motor structure according to claim 1, wherein the second end portion comprises a fastening element having two arms opposite to each other, wherein the winding set comprises at least one conductive terminal clamped between the two arms of the fastening element to be electrically connected with the at least one conductive element.

4. The motor structure according to claim 1, wherein the heat dissipation module, the motor base, the at least one conductive element and the at least one gasket element are integrally formed into one piece by over molding or insert molding.

5. The motor structure according to claim 1, wherein the winding set comprises an engagement component engaged with the at least one conductive element.

6. The motor structure according to claim 1, wherein the heat dissipation module comprises at least one heat dissipation element convexly disposed on the second side.

7. The motor structure according to claim 1, further comprising a first cover disposed on the first side of the heat dissipation module, connected to the motor base and covering the circuit board.

8. The motor structure according to claim 1, further comprising a second cover disposed on the second side of the heat dissipation module and connected to the motor base, wherein an accommodation space is defined by the second cover, the motor base and the heat dissipation module, and the winding set is at least partially received within the accommodation space.

9. The motor structure according to claim 8, wherein the motor base comprises an airflow channel in fluid communication with the accommodation space.

10. The motor structure according to claim 1, further comprising a thermal conductive element disposed between the first side of the heat dissipation module and the circuit board, wherein the thermal conductive element is at least one selected from the group consisting of a thermal adhesive, a thermal pad and a thermal paste.

11. The motor structure according to claim 1, further comprising a fan blade assembly, wherein the fan blade assembly is connected to the rotor.

12. The motor structure according to claim 1, wherein the motor base comprises:

a central portion connected to the heat dissipation module;

a surrounding portion disposed around the central portion; and at least one connecting element deformable and connected between the central portion and the surrounding portion, wherein the connecting element comprises:

a first supporting part connected with the central portion, wherein the hardness of the first supporting part is greater than or equal to the hardness of the central portion;

a second supporting part connected with the surrounding portion, wherein the hardness of the second supporting part is greater than or equal to the hardness of the supporting part; and a deformation part connected between the first supporting part and the second supporting part.

13. The motor structure according to claim 12, wherein the central portion, the surrounding portion and the at least one connecting element are integrally formed into one piece by over molding or insert molding.

14. The motor structure according to claim 12, wherein the winding set is fixed on the central portion.

15. The motor structure according to claim 12, wherein the motor base comprises a buffer component disposed between the central portion and the surrounding portion.

16. The motor structure according to claim 15, wherein the first supporting part, the second supporting part and the deformation part cooperatively form a buffer zone, and the buffer component is filled within the buffer zone.

17. The motor structure according to claim 16, wherein the central portion, the surrounding portion, the at least one connecting element and the buffer component are integrally formed into one piece by over molding or insert molding.

* * * * *